United States Patent [19]

Teo

[11] 4,181,779
[45] Jan. 1, 1980

[54] CELL USING HALOGEN REACTIVE MATERIAL SUCH AS ORGANO-METALLIC POLYMER

[75] Inventor: Boon K. Teo, Scotch Plains, N.J.

[73] Assignee: Bell Telephone Laboratories, Incorporated, Murray Hill, N.J.

[21] Appl. No.: 7,817

[22] Filed: Jan. 30, 1979

[51] Int. Cl.² .............................................. H01M 6/04
[52] U.S. Cl. ...................................... 429/199; 429/213
[58] Field of Search ................ 429/213, 101, 199, 218

[56] References Cited

U.S. PATENT DOCUMENTS

| | | | |
|---|---|---|---|
| 3,352,720 | 11/1967 | Wilson et al. | 429/213 |
| 3,660,164 | 5/1972 | Hermann et al. | 429/213 X |
| 4,132,836 | 1/1979 | Greatbatch | 429/101 X |

OTHER PUBLICATIONS

J. Am. Chem. Soc. 99, pp. 2349–2350, 4862–4863, (1977).
Tetrahedron, 28, pp. 963–965, (1972).
J. Am. Chem. Soc. 98, pp. 232–234, (1976).

Primary Examiner—Charles F. LeFevour
Attorney, Agent, or Firm—Richard D. Laumann

[57] ABSTRACT

Cells utilizing halogen reactive materials such as organo-metallic polymers having the nominal stoichiometry $[M(TTL)]_x$ in which M is a transition metal containing complex having at least one transition metal ion, TTL has the nominal atom composition $C_{10}H_4X_4$ and substituted compositions thereof in which X is selected from the group consisting of S, Se, Te and mixtures thereof, and x is equal to or greater than 1 are described.

11 Claims, No Drawings

4,181,779

CELL USING HALOGEN REACTIVE MATERIAL SUCH AS ORGANO-METALLIC POLYMER

TECHNICAL FIELD

This invention relates generally to cells and particularly to cells using halogen reactive materials such as organo-metallic polymers as the active electrode material.

BACKGROUND OF THE INVENTION

The rising cost of energy and decreasing fossil fuel resources have generated considerable interest in recent years in the development of new energy generating and storing devices. Although this interest has been directed to many types of devices, much has been directed to cells because of the possibilities they afford of having at least some properties superior to those of the now conventional and presently widely used batteries or cells. Desirable cell properties include high energy densities per unit weight and per unit volume, long shelf life, low cost and ease of fabrication.

Many approaches have been taken in attempts to improve the properties of cells. However, the primary interest in recent years seems to have centered around attempts to develop cells using new electrode materials. Numerous materials and classes of materials have been and are being investigated for use as the active electrode material. For example, use of layered dichalcogenides of the transition metals of groups IVB and VB of the periodic table has been investigated. These materials are attractive electrode material candidates because a number of species, such as lithium or sodium ions, can move easily between layers during charge or discharge of the cell. Cells using such materials as the active material in an electrode afford realistic prospects of functioning efficiently for many cycles. Other systems, such as lithium/sulfur, which is attractive because its theoretical specific energy of 2600 watt-hours/kilogram exceeds that of lead-acid cells by more than an order of magnitude, have also been the subject of intensive investigation.

However, while many of the cells based upon these and other systems are extremely promising, the search for new classes of materials that are potentially useful as either the active positive or negative electrode material continues. The investigation of the use of organic compounds as the active electrode material in cells is of both theoretical and practical interest because of the large number of compounds available for investigation. However, such compounds have not been the subject of intensive investigation. This is surprising because a large number of organic compounds exhibit interesting electrical properties.

SUMMARY OF THE INVENTION

It has been found that halogen reactive materials such as organo-metallic complexes represented by the nominal formula $[M(TTL)]_x$ in which M is a transition metal containing complex having at least one transition metal ion selected from group VIII of the periodic table, TTL has the nominal atom composition $C_{10}H_4X_4$, and represents both substituted and unsubstituted TTL, in which X is selected from the group consisting of S, Se and Te; and x is equal to or greater than 1, form useful active electrode material in cells. To increase stability of the active material and render it less soluble in common electrolytes, it is desirable that x be equal to or greater than 2, i.e., it is desirable that the complex be polymerized. When the complex forms the active negative electrode material, the active positive electrode material may be, for example, bromine and iodine. When the complex forms the active positive electrode material, the active negative electrode material may be lithium or sodium. In a preferred embodiment, the electrolyte contains a metal halide such as LiBr or KBr.

In one preferred embodiment, TTL is tetrathiotetracene (TTT), M is NI, and the active positive electrode material is bromine.

DETAILED DESCRIPTION

Cells may be constructed by any of the well-known and conventional methods in which a first electrode containing the halogen reactive material such as the organo-metallic polymer of this invention as the active material is spaced from a second electrode and both electrodes are in mutual contact with an electrically conductive, i.e., easy migration of ions is permitted, electrolyte. The electrolyte should be nonreactive, before charging, with both positive and negative electrode materials. The class of typical electrolytes includes solutions of potassium bromide (KBr) and lithium bromide (LiBr) in water or organic solvents such as propylene carbonate. Current collectors contact both the positive electrode an negative electrode in conventional manner and permit an electrical current to be drawn by an external circuit. The active electrode material of the first electrode consists of halogen reactive material such as organo-metallic complex that may be represented by the nominal formula $[M(TTL)]_x$. In the formula, M is a transition metal containing complex having at least one transition metal ion selected from Group VIII Of the periodic table, TTL an organic complex and x represents the number of times the unit is repeated. x is equal to or greater than 1. M may include only one transition metal atom or it may include one transition metal atoms and one or more nontransition metal atoms, etc.

It is desirable that x be equal to or greater than 2. When the first electrode is negative, the active material of the second electrode may be bromine or iodine. When the first electrode is positive, the active material of the second electrode may be lithium or sodium. Although the composition of the active material of the first electrode is described in terms of a stoichiometric composition, this composition is the nominal composition and the actual compositions used may deviate from the nominal composition by as much as plus or minus five percent of any included element from stoichiometry without seriously degrading cell performance. It should also be understood that although the first electrode is described as consisting of the halogen reactive material such as an organo-metallic complex, an inert material, acting generally as a binder or halide carrier such as an ionic conductor, may also be present.

The organic complexes represented by TTL have the nominal atom composition $C_{10}H_4X_4$ in which X is selected from the group consisting of S, Se, Te and mixtures thereof. The molecules are structurally planar with extensive electron delocalization and the two chalcogenchalcogen bonds are well situated for oxidative addition reactions with low valence transition metal complexes, and, in fact, constitute a bridge between the two metal atoms or complexes.

It is contemplated that the above-described composition may be varied by ring substitution and TTL, as used in this specification, is meant to encompass such ring substituted molecules as well as the unsubstituted molecule represented by $C_{10}H_4X_4$. $C_{10}H_4X_4$ as used thus means the unsubstituted composition and the substituted compositions. For example, the four hydrogen atoms in $C_{10}H_4X_4$ may be replaced by two benzo rings to form $C_{18}H_8X_4$ or by four chlorine atoms to form $C_{10}Cl_4X_4$. Additionally, one or more of the hydrogen atoms might be replaced by one or more alkyl or aryl groups. In addition to the mentioned substitutions, any hydrocarbon grouping that does not modify structure might be used. If X is S, the resulting compounds are commonly called tetrathiotetracene (TTT), tetrathionaphthalene (TTN) and tetrachlorotetrathionaphthalene (TCTTN).

Methods for preparing TTT, TCTTN and TTN are known to persons working in the art. For example, the properties of TTT and its synthesis were described by Marschalk in 1948 in *Bulletin de la Societe Chimique de France* 15 418 (1948). Successful preparation of TCTTN and TTN has been achieved more recently and methods for preparing these compounds are described in *Tetrahedron*, 28, 963 (1972) and *Journal of the American Chemical Society* 98, 252 (1976), respectively. Methods of preparing the other included compounds will be apparent to those skilled in the art.

As will be apparent from the following discussion, M may consist of only a single transition metal atom, such as Ni, from Group VIII of the periodic table but it is also contemplated that situations may occur in which M includes more than one transition metal atom as well as nontransition metal atoms, i.e., M is a transition metal containing complex. For example, M may represent $Co_2(CO)_2$.

Preparation of the organo-metallic polymers represented by $[M(TTL)]_x$, x greater than or equal to 2, and used as the active first electrode material will be described by reference to two detailed and specific examples. After consideration of these preparatory methods, methods of preparation useful for the other organo-metallic polymers of this invention will be apparent to those skilled in the art.

EXAMPLE 1

The series of polymers represented by the formula $[Ni(TTL)]_x$ may be prepared by mixing a 2:1 molar ration of $Ni(CO)_2(PPh_3)_2$ and TTL. The resulting mixture is refluxed in freshly distilled benzine under an inert atmosphere, such as nitrogen, at a refluxing temperature of approximately 75 degrees C. for a time of approximately 24 hours. A dark brown-red amorphous precipitate forms as the reaction proceeds. The precipitate is filtered, washed thoroughly with an organic solvent such as benzene and vacuum-dried.

EXAMPLE 2

The series of polymers represented by the formula $[M(TTL)]_x$ in which M comprises $Co_2(CO)_2$ may be prepared by reacting a stoichiometric amount of TTL with $Co_2(CO)_8$ in benzene. The reaction is desirably carried out under an inert atmosphere, such as nitrogen, at a refluxing temperature of approximately 75 degrees C. for a time of approximately 24 hours. As the reaction proceeds, a dark red precipitate, showing no x-ray powder pattern, forms. The precipitate is filtered, washed thoroughly with an organic solvent such as benzene and vacuum-dried.

The infrared spectrum of both of the resulting compounds is consistent with the linear polymeric structure in which each of the transition metal-containing units is bridged by four sulphur atoms, two from each of the adjacent TTL ligands. It is believed that this structure lends itself to topotactic or intercalation reactions which represent oxidation of the polymer chains with a molecular species, such as iodine or bromine, which is reduced to iodide or bromide or the respective poly anions which intercalate into the solid matrix.

After drying, the organo-metallic polymer material is formed into an electrode by pressing in well-known manner. If the resistance of the active electrode material is sufficiently high to cause large dissipative losses, conductivity may be increased by adding an electrically conducting, but chemically nonreactive, material, such as graphite, to the electrode.

No special precautions need be taken during preparation of the cell due to the nature of the organometallic polymer because the polymers, in both the neutral and the oxidized form, are stable with respect to water, air and temperature variations. However, if the organometallic polymer forms the active positive electrode material and the active negative electrode material is a highly reactive material such as lithium, well-known precautions that need not be elaborated upon must be taken.

When $[M(TTL)]_x$ is used as the active negative electrode material, the positive electrode may have as its active material any material that can oxidize $[M(TTL)]_x$ and provide a species that may be reversibly incorporated into the active negative electrode. Two materials that are conveniently used as the active positive electrode material are poly-2-vinylpyridine-iodine($P2VP.(x/2)I_2$) and its bromine analog. When these materials form the active positive electrode material, it has been found that other halogen reactive materials such as iron may be used as the active negative electrode material.

When $[M(TTL)]_x$ is used as the active positive electrode, the active negative electrode material may be lithium or sodium. A suitable electrolyte is LiBr in propylene carbonate. When lithium forms the active negative electrode material, it has been found that other halogen reactive materials, such as nickel, may be used as the active positive electrode material with a halogen containing electrolyte.

EXAMPLE 3

The negative electrode contained 3 mg of $[Ni(TTT)]_x$ as the active material and the positive electrode contained $(P2VP.(x/2)Br_2)$ as the active positive electrode material. The electrolyte was 1 M KBr dissolved in water. Electrical contact was made to the cell with iron screws. Cell voltage was approximately 0.7 volts some of which may be attributed to the iron acting as active negative electrode material.

EXAMPLE 4

The positive electrode contained 2.6 mg of $[Ni(TTT)]_x$ as the active material and the negative electrode contained lithium as the active negative electrode material. The electrolyte was LiBr in propylene carbonate. Electrical contact was made to the cell with nickel screws. Cell voltage was approximately 1.8 volts during discharge with a current of 50 ma. Some of the voltage may be attributed to the nickel acting as the active positive electrode material.

I claim:

1. A battery cell comprising a first electrode, a liquid electrolyte comprising an alkali halide and a second electrode, characterized in that said first electrode comprises an organo-metallic polymer having the nominal composition $[M(TTL)]_x$ in which M comprises at least one transition metal ion selected from group VIII of the periodic table, TTL has the nominal atom composition $C_{10}H_4X_4$, and represents both substituted and unsubstituted TTL, X selected from the group consisting of S, Se, Te and mixtures thereof, and x is greater than or equal to 1.

2. A cell as recited in claim 1 in which x is equal to or greater than 2.

3. A cell as recited in claim 2 in which said first electrode is negative.

4. A cell as recited in claim 3 in which said second electrode consists of poly-2-vinylpyridine-bromine.

5. A cell as recited in claim 1 or 4 in which said electrolyte comprises potassium bromide.

6. A cell as recited in claim 1 or 4 in which said M is Ni.

7. A cell as recited in claim 1 or 4 in which said M consists of $Co_2(CO)_2$.

8. A cell as recited in claim 6 in which TTL is selected from the group consisting of tetrathioetetracene, tetrathionaphthalene, and tetrachlorotetrathionaphthalene.

9. A cell as recited in claim 2 in which said first electrode is positive.

10. A cell as recited in claim 9 in which said second electrode is selected from the group consisting of lithium and sodium.

11. A cell as recited in claim 9 or 10 in which said electrolyte comprises LiBr in propylene carbonate.

* * * * *

UNITED STATES PATENT AND TRADEMARK OFFICE
CERTIFICATE OF CORRECTION

PATENT NO. : 4,181,779

DATED : January 1, 1980

INVENTOR(S) : Boon K. Teo

It is certified that error appears in the above-identified patent and that said Letters Patent are hereby corrected as shown below:

Column 2, line 10, "NI" should read --Ni--; line 28, "an" should read --and--; line 36, "Of" should read --of--.

Signed and Sealed this

Thirteenth Day of May 1980

[SEAL]

Attest:

SIDNEY A. DIAMOND

Attesting Officer      Commissioner of Patents and Trademarks